US009691234B2

(12) United States Patent
Kallin

(10) Patent No.: US 9,691,234 B2
(45) Date of Patent: Jun. 27, 2017

(54) SECURE COLLECTION

(71) Applicant: NCR Corporation, Duluth, GA (US)

(72) Inventor: Fred Kallin, Waterloo (CA)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/862,516

(22) Filed: Sep. 23, 2015

(65) Prior Publication Data

US 2016/0012685 A1 Jan. 14, 2016

Related U.S. Application Data

(62) Division of application No. 13/308,112, filed on Nov. 30, 2011, now Pat. No. 9,147,323.

(51) Int. Cl.

| | |
|---|---|
| ***G06F 19/00*** | (2011.01) |
| ***G07F 19/00*** | (2006.01) |
| ***G07F 7/04*** | (2006.01) |
| ***G07D 11/00*** | (2006.01) |

(52) U.S. Cl.
CPC ....... *G07F 19/205* (2013.01); *G07D 11/0021* (2013.01); *G07D 11/0096* (2013.01); *G07F 7/04* (2013.01); *G07F 19/201* (2013.01)

(58) Field of Classification Search
USPC .......................................................... 235/379
See application file for complete search history.

(56) References Cited

U.S. PATENT DOCUMENTS 4,665,839 A * 5/1987 Heyl ........................ E05G 7/001
109/24.1

* cited by examiner

*Primary Examiner* — Jamara Franklin
(74) *Attorney, Agent, or Firm* — Schwegman, Lundberg & Woessner

(57) ABSTRACT

An apparatus and method are disclosed for securely storing items of media. The apparatus includes a storage bag body having an open mouth region and a sealing collar extending around at least a portion of the mouth region. The collar includes a first and second elongate side bar, each having a first and second end and a first pair of hinged end bars disposed in an end-to-end configuration between respective first ends of the side bars and a second pair of hinged end bars disposed in an end-to-end configuration between the respective second ends of the side bars. At least one side bar and at least one end bar in each pair of end bars comprises at least one securing element for irreversibly sealing the mouth region of the storage bag body closed.

2 Claims, 11 Drawing Sheets

SECURE COLLECTION

CROSS-REFERENCE TO RELATED APPLICATION

The present application is a divisional application and claims the benefit of the filing date of application Ser. No. 13/308,112, filed Nov. 30, 2011, entitled, “Secure Collection”.

FIELD OF INVENTION

The present invention relates to an apparatus and method for securely storing items of media. In particular, but not exclusively, the present invention relates to the use of a storage bag for storing currency notes or checks deposited in a deposit module. Each storage bag may be closed in an irreversible manner so that deposited items may only be removed subsequent to closure by destroying part of the bag or otherwise visibly tearing a bag open.

BACKGROUND TO THE INVENTION

Media depositories are used to receive media items from a customer. One common type of media depository is a sheet media depository for receiving items of media in sheet form. For example, such items of media can be currency notes, checks, tickets, giros or the like.

Sheet media depositories are used in automated teller machines (ATMs) and other self-service terminals. Other such self-service terminals are vending machines, change machines or the like. The sheet media depositories are used to identify, validate and store or return deposited sheets.

Some sheet depositories are capable of receiving a bunch of sheets in a loading area and then picking individual sheets from the bunch so that each sheet can then be identified and validated individually prior to storage of the validated sheet within a depository or returned to a customer. These depositories are sometimes referred to as bunch sheet depositories. Bunch sheet depositories may transport the bunch from a loading area to a picking area or the picking area may be adjacent to the loading area. The depositories are also sometimes referred to as deposit modules.

During use, users deposit currency notes as single items or as a bunch and these are selectively retained within the self-service terminal. Over a period of time a considerable quantity of currency notes and thus a relatively high value of items may be stored and retained in secure containers within the terminal. From time to time it is necessary for personnel to visit the terminal to empty the storage containers. Security as well as speed of service is an issue when such collection occurs. It is desirable for a storage bag to be easy to install or remove. Also, it should be impossible for items stored in a bag to be removed without destruction of the storage bag. Such removal might otherwise be attempted by personnel collecting the bag who might attempt to temporarily open the bag so as to access currency notes therewithin.

Various storage techniques have been suggested. However, these are prone to undetected tampering and/or require multiple personnel to attend the terminal to supervise secure removal and/or are difficult to install and thus costly in terms of service requirements.

SUMMARY OF THE INVENTION

It is an aim of the present invention to at least partly mitigate the above-mentioned problems.

It is an aim of certain embodiments of the present invention to provide a deposit module which stores deposited currency notes or the like in a secure bag which is tamper evident. That is to say, attempts to open the secure bag cannot go undetected.

It is an aim of certain embodiments of the present invention to provide a housing in a self-service terminal into which security bags may easily be fitted and removed, and which enables items of media, such as currency notes or the like to be deposited and thereafter safely stored.

According to a first aspect of the present invention there is provided apparatus for securely storing items of media, comprising:

a storage bag body comprising an open mouth region; and a sealing collar extending around at least a portion of the mouth region, the collar comprising a first and second elongate side bar, each having a first and second end and a first pair of hinged end bars disposed in an end-to-end configuration between respective first ends of the side bars and a second pair of hinged end bars disposed in an end-to-end configuration between the respective second ends of the side bars; wherein at least one side bar and at least one end bar in each pair of end bars comprises at least one securing element for irreversibly sealing the mouth region closed.

Aptly, each said side bar comprises each said side bar comprises a bag guide surface that guides a side bar at a mating housing guide surface of a bag housing.

Aptly, the first pair of end bars comprises a tab member.

Aptly, a first end of a first end bar of the first pair of end bars is hingedly disposed in an end-to-end configuration with a first end of the first side bar and a second end of a second end bar of the first pair of end bars is hingedly disposed in an end-to-end configuration with a first end of the second side bar.

Aptly, a first end of a first end bar of the second pair of end bars is hingedly disposed with respect to a second end of the first side bar via a first connection element and a second end of a second end bar of the second pair of end bars is hingedly disposed with respect to a second end of the second side bar via a second connection element.

Aptly, the bag body is plastic and/or the collar is rigid or semi-rigid polypropylene and/or the collar comprises a plurality of blind snap elements.

According to a second aspect of the present invention there is provided apparatus for housing a secure storage bag comprising:

a housing body comprising a roof panel element, a first and second side wall each extending downwardly from a respective side edge region of the roof panel, an end side wall comprising an item input orifice and extending downwardly from a respective edge region of an end region of the roof panel, and at least one further end side wall extending downwardly from the roof panel element; and a first and second door element hingedly connected to a respective one further end side wall.

Aptly, each side wall of the housing body comprises a housing guide surface that guides a mating bag guide surface of a secure storage bag as a bag is located in the housing body.

Aptly, each door element comprises a locking member that locks the respective door element closed when a secure storage bag is located in the housing.

Aptly, each locking member comprises a locking tab comprising a locking aperture and said housing body further comprises a locatable latch member locatable responsive to a position of a solenoid driven element, said latch member comprising at least one hook element arranged to hook into a locking aperture to secure the door element in a closed configuration.

Aptly, at least one sensor element mounted at the at least one further side wall of the housing body to sense a closing state of at least one door element, and to initiate the solenoid driven element to locate the latch member to secure the door element in a closed configuration.

Aptly, at least one pair of opposed endless belt members co-operate to locate an item or bunch of items of media from the item input orifice to a drop region in a bag body secured in the housing.

According to a third aspect of the present invention there is provided an automated teller machine (ATM) comprising a deposit module comprising apparatus for housing a secure storage bag. The housing includes a housing body comprising a roof panel element, a first and second side wall each extending downwardly from a respective side edge region of the roof panel, an end side wall comprising an item input orifice and extending downwardly from a respective edge region of an end region of the roof panel, and at least one further end side wall extending downwardly from the roof panel element and a first and second door element hingedly connected to a respective one further end side wall. Optionally, each item of media comprises a currency note or the like.

According to a fourth aspect of the present invention there is provided a method of storing at least one item of media in a secure storage bag, comprising the steps of:

providing an item of media or a bunch of items of media at an input orifice of a housing body of a deposit module; and rotating at least one endless belt member of the housing body to locate said item or bunch of items at a drop zone in a secure storage bag comprising at least one securing element for irreversibly sealing a mouth region of the bag housed in the housing body.

According to a fifth aspect of the present invention there is provided a product which comprises a computer program comprising program instructions for:

transporting an item of media or a bunch of items of media to an input orifice of a housing body of a deposit module; and rotating at least one endless belt member of the housing body to locate said item or bunch of items at a drop zone in a secure storage bag comprising at least one securing element for irreversibly sealing a mouth region of the bag housed in the housing body.

The computer program may also include program instructions for raising a transport mechanism so that the secure storage bag may be inserted or removed without touching the transport mechanism, and lowering the transport mechanism when the secure storage bag is fully inserted.

Certain embodiments of the present invention provide a storage bag which is automatically sealed as it is removed from a secure housing in a deposit module. The method of sealing is such that the bag can thereafter not be opened without cutting or ripping the bag or a sealing collar of the bag. In this sense the bag is tamper evident.

Certain embodiments of the present invention enable the secure storage of deposited currency notes or the like in a storage bag fitted in a housing of a self-service terminal. In use the self-service terminal operates to continually deposit one or more currency notes in a bag housed in the housing without user interaction. This helps improve security.

Certain embodiments of the present invention provide a deposit module which can be replenished with an empty bag and have a full or partially full bag collected by a single person without risk of currency notes being removed unnoticed.

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
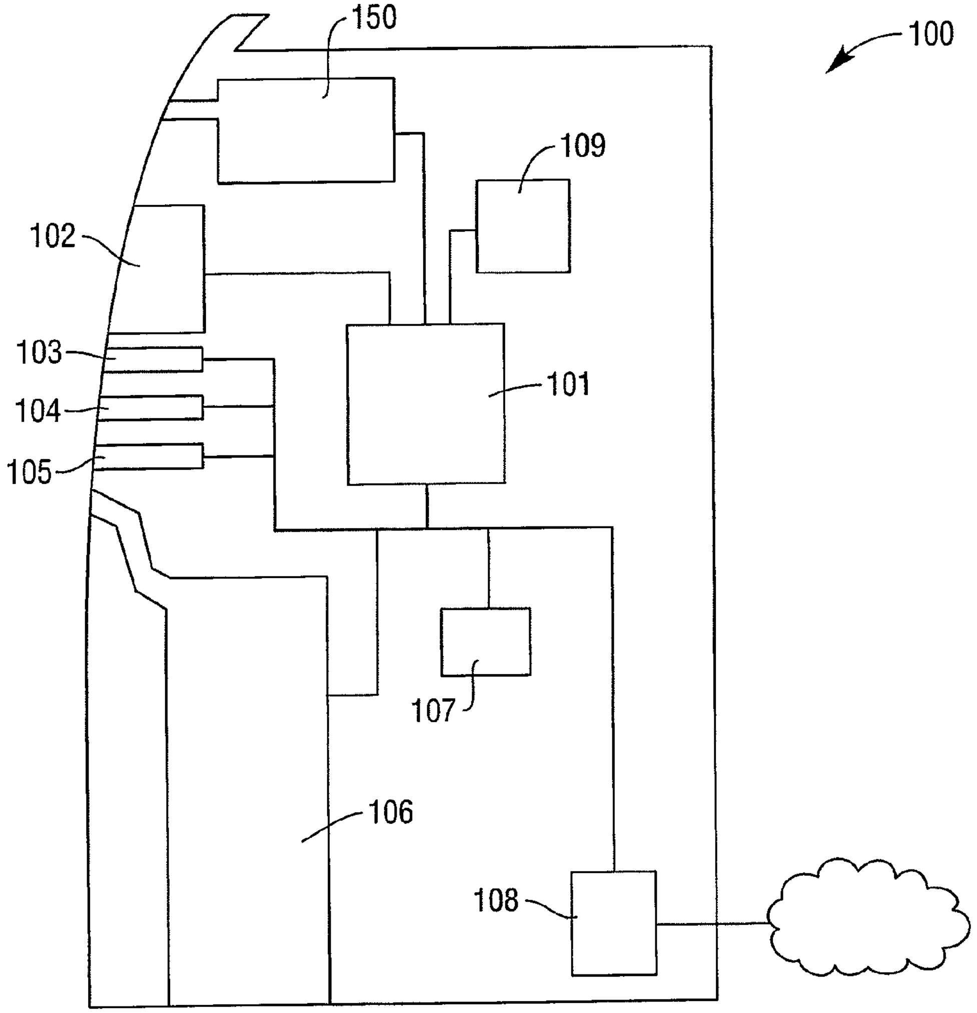
FIG. 1 is a schematic diagram of an ATM.

In the drawings like reference numerals refer to like parts.

FIG. 1 illustrates a block diagram of a self-service terminal 100 in the form of an automated teller machine (ATM) according to one embodiment of the present invention. It will be understood that certain embodiments of the present invention are applicable to other types of terminal such as vending machines, change machines and the like.

The ATM 100 includes different modules for enabling transactions to be executed and recorded by the ATM 100. These ATM modules include customer transaction modules and service personnel modules. The ATM modules include an ATM controller 101, a customer display 102, a card reader/writer module 103, an encrypting keypad module 104, a receipt printer module 105, a cash dispenser module 106, a journal printer module 107 for creating a record of every transaction executed by the ATM, a connection module 108, an operator panel module 109 for use by a service operator (such as a field engineer, a replenisher (of currency, of printed paper or the like), or the like).

Certain customer transaction modules (such as the ATM controller 101) are also used by the service personnel for implementing management functions. However, some of the modules are referred to herein as service personnel modules (such as the journal printer module 107 and the operator panel module 109) because they are never used by ATM customers.

FIG. 1 also illustrates a schematic diagram of a deposit module 150 according to one embodiment of the present invention. The deposit module 150 is operable to receive bunches of items of media such as currency notes, bank notes and/or checks from a customer. These can be stored securely or returned to a customer.

Figure 2:
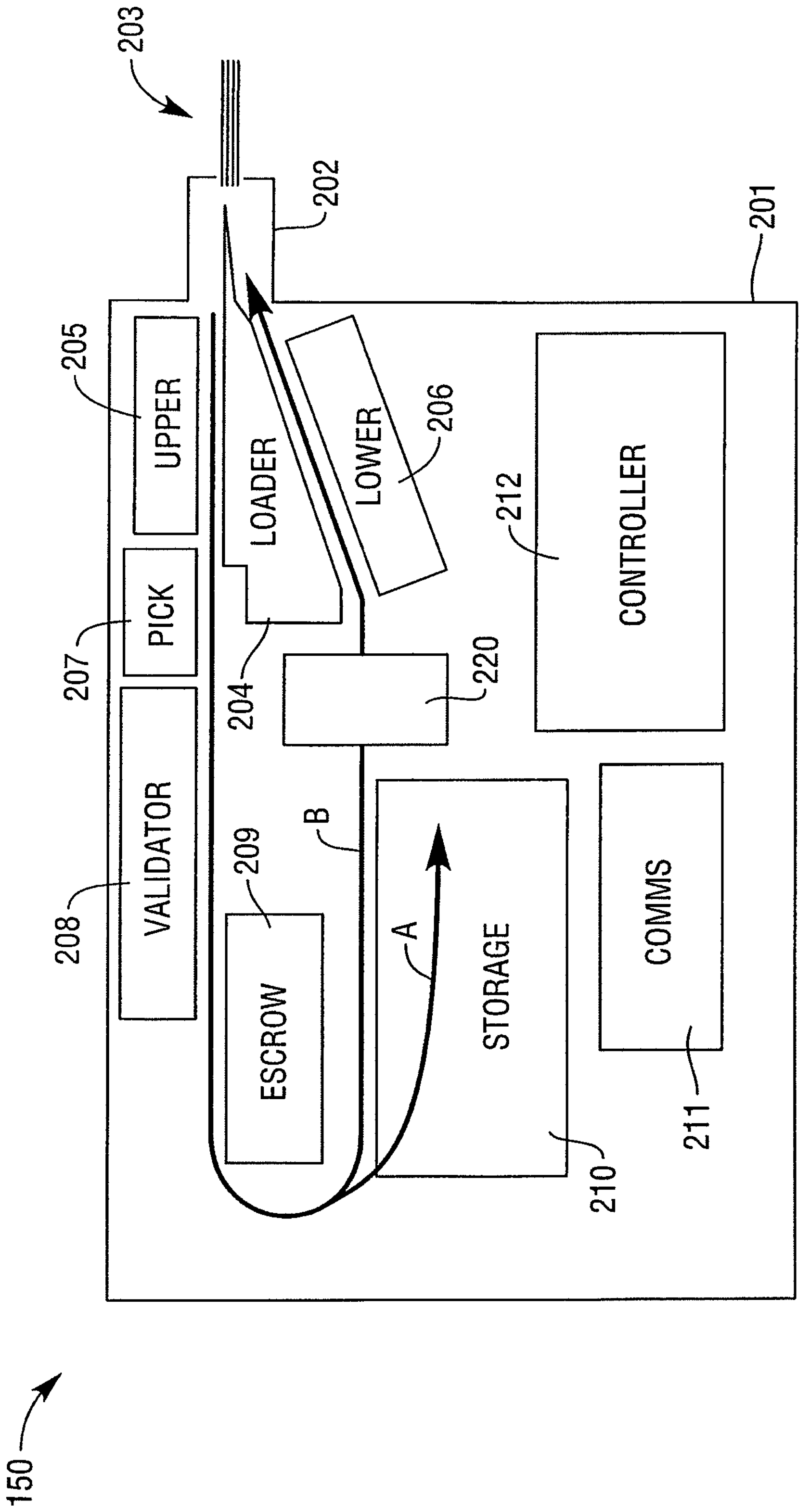
FIG. 2 is a schematic diagram of a bunch sheet depository, according to one embodiment of the present invention, suitable for use in the ATM of FIG. 1.

The depository is shown in more detail in FIG. 2 and includes a chassis 201 onto which various parts are mounted. The depository 150 further includes a bunch deposit slot 202 at which a customer (not shown) can introduce a bunch 203 of currency notes or other such items of media. This enables the sheet items of media to be deposited by a customer. A bunch loader 204 co-operates with an upper loading unit 205 and a lower dispatch unit 206. These co-operate to receive the bunch of items of media and move them to a pick unit 207 or return them to a customer via slot 202 respectively. The pick unit 207 is aligned with the bunch loader 204 for removing individual sheets from the bunch of sheets 203. A sheet validator 208 determines whether the items of media are valid. An escrow 209 is provided for temporarily storing validated sheets until a customer confirms they wish to complete a transaction. A storage compartment 210 is provided as well as a communication circuit board 211 for communicating with the self-service terminal into which the depository 15 may be installed. An on-board controller 212 is provided for controlling the operation of the depository 150.

The depository 150 includes a plurality of transport units only some of which are described herein. An upper sheet transport section 205 is located above the bunch loader and adjacent to the picker 207. A lower sheet transport section 206 is located beneath the bunch loader 204 and near the bunch deposit slot 202.

The bunch loader 204 is used to transport deposited bank notes from the bunch deposit slot 202 to the pick unit 207.

There are two different routes that can be taken by an item of media that is inserted into the depository 150. A first route is shown by arrow A and involves the sheet item being picked from the bunch of sheets 203, transported to the picker unit 207, moved past the validator 208 to be identified and validated, placed in the escrow 209 and from the escrow 209 transported into the storage compartment 210.

The second optional route is shown by the arrow B and involves the sheet item being picked from the bunch of sheets 203, transported to the picker unit 207, moved past the validator 208 to be identified and validated, placed in the escrow 209 and from the escrow 209 returned to the customer via a rebunching unit 220 and via the loading unit 204 and lower transport section 206.

As will be understood by those skilled in the art, whether a sheet item is stored (that is to say, follows the route shown by arrow A) or returned to a customer (that is to say, follows a path shown by arrow B) depends on a number of factors, such as whether the sheet is recognized, whether a sheet is validated and/or whether a customer cancels or confirms a transaction or the like.

Figure 3:
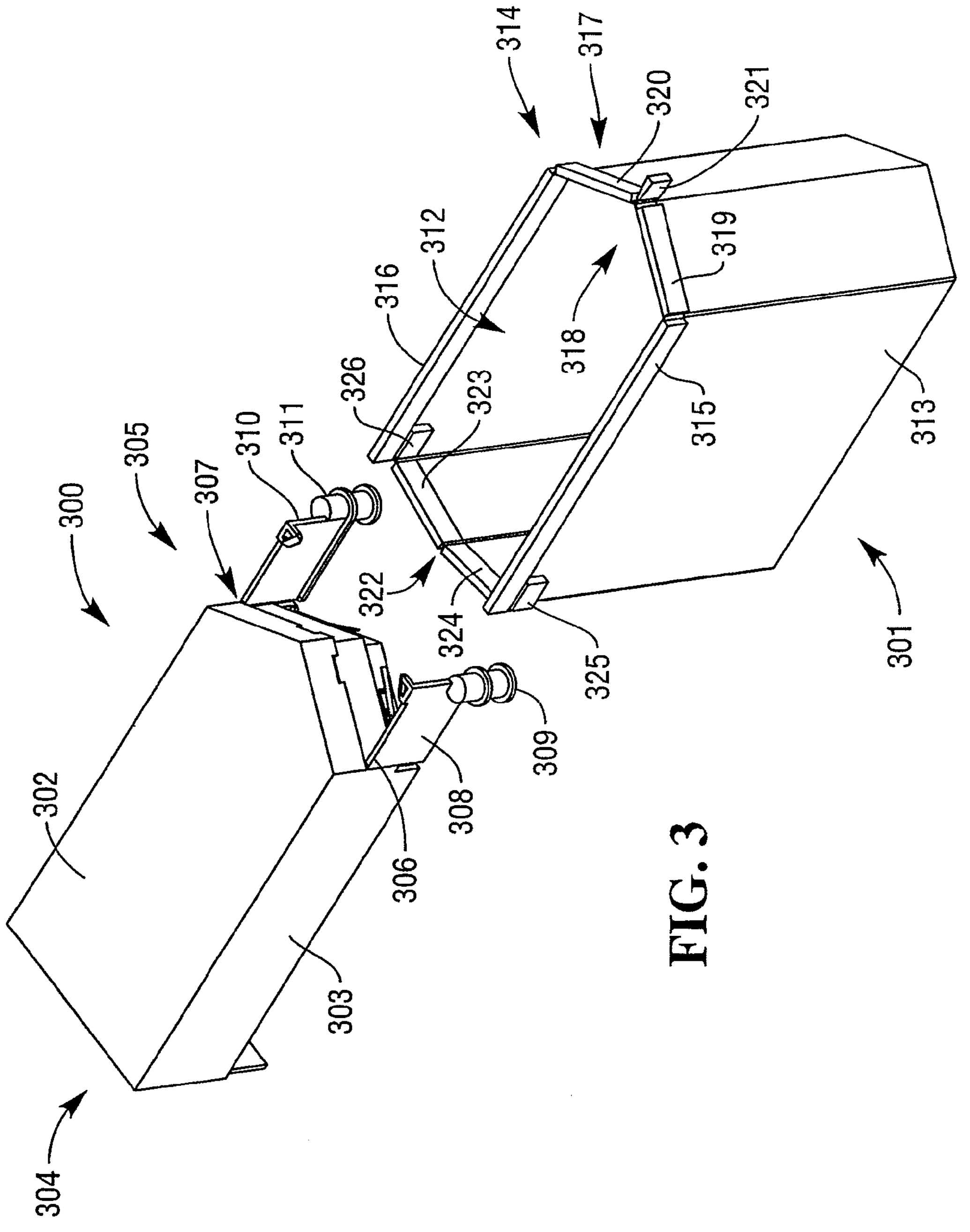
FIG. 3 is a schematic diagram illustrating part of the bunch sheet depository (a secure housing and a security bag being fitted thereto) of FIG. 2.

FIG. 3 illustrates parts of the storage compartment 210. The storage compartment 210 includes a rigid case (not shown) together with one or more access doors (not shown). The rigid case prevents unauthorized access to items stored in the compartment. Inside the storage case is a rigid housing 300 into which a storage bag 301 may be removably located. The housing 300 includes a roof panel 302 and side walls 303 which extend downwardly therefrom at respective edges of the roof panel 302. The side walls 303 are substantially parallel and in a spaced apart configuration. An end side wall 304 extends downwardly from an end edge region of the roof panel 302 and closes an opening between the side walls 303. A slit (not shown in FIG. 3) is provided in the end wall 304 through which one or more items of media such as currency notes or the like are propelled during a storage mode of operation.

The further end region 305 of the housing 300 is provided by two further end walls 306, 307 which are generally angled together to form an arrow-shaped configuration at the front opening end of the housing. A door 308 is hinged at a first end thereof to the first further end wall 306. The door is a substantially planar panel and carries a substantially cylindrical closure mechanism 309. A second door 310 is also hingedly secured to a further end wall of the housing 300 and also carries a substantially cylindrical closing mechanism 311. The outer surface of the cylindrical body provides an abutment surface which aids bag loading and unloading. The outer surface includes ribs (closing ribs) which also helps with the process.

The secure bag 301 is a flexible receptacle having an open mouth 312 and a body 313. The body 313 may be a single sealed enclosure or may include more than one flexible panels secured together. Aptly, the security bag 301 is a clear plastic bag. A rigid or semi-rigid collar 314 extends around the rim of the open mouth of the bag 301. The collar includes a first elongate side wall (side bar) 315 and a further elongate side wall (side bar) 316 which in an open configuration is spaced apart from and substantially parallel to the first side wall. At a first end region 317, the side walls of the collar are connected together by a pair 318 of hinged collar end bars 319, 320. A tab 321 secured to the pair of end bars 319,320 provides a manually operated pulling handle which can be grasped by a user to pull the bag 301 away from the housing subsequent to use.

At a second end region 322 of the collar, a further pair of hinged end bars 323, 324 are secured together to respective second ends of the elongate collar bars 315,316 by respective connecting elements 325, 326. Optionally, the side bars 315,316 may be L-shaped thus avoiding the need for the connecting pieces. The L-shaped side bars 315,316 are provided with running grooves to receive the guide elements on the doors and/or the housing interior.

Figure 4:
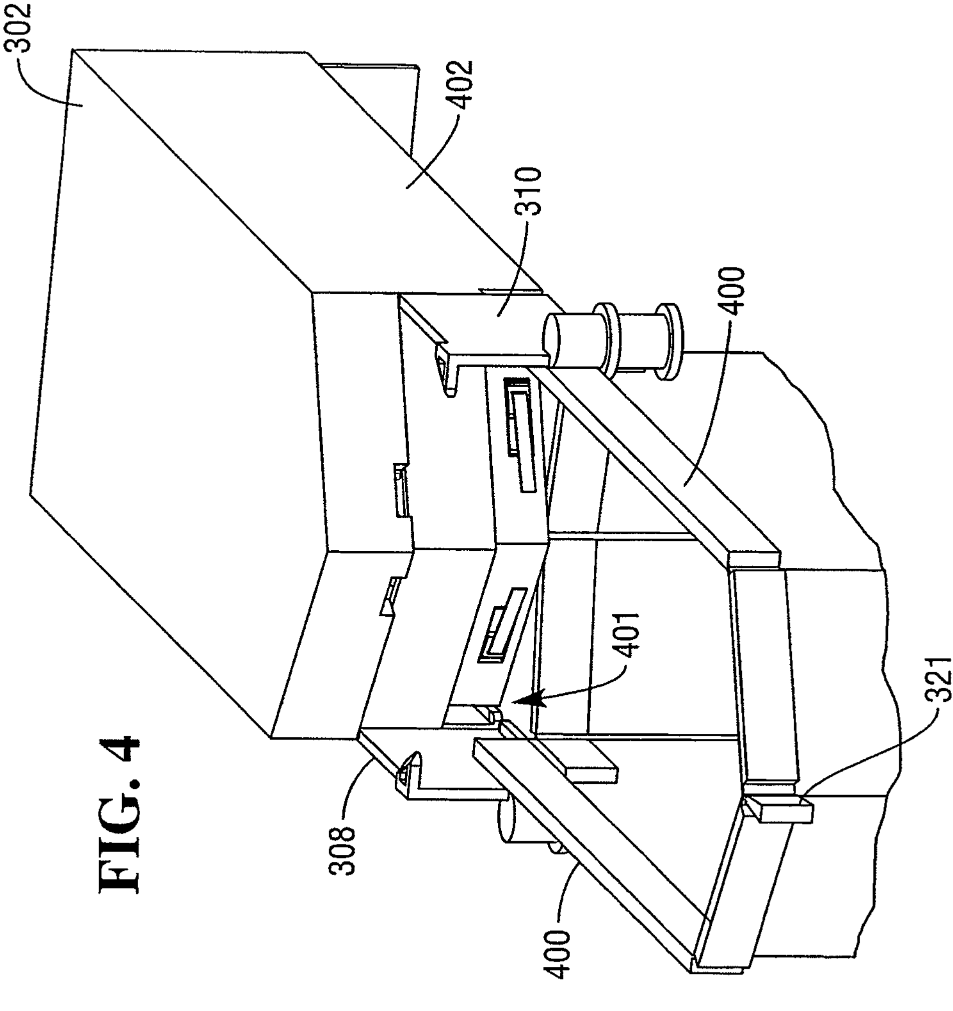
FIG. 4 illustrates the security bag being located in the secure housing.

FIG. 4 illustrates how the secure bag 301 may be fitted by a user into the housing when service personnel attend the deposit module to prepare the self-service terminal for operation. The doors 308, 310 are opened by a user and an open bag 301 is slid into the housing. The collar bars 314 are manufactured from a rigid or semi-rigid material such as polypropylene or the like whereby the shape and configuration of the outer surface 400 of the side bars guide the bag by operating in a co-operating fashion with guide bars 401 in the housing. In this way, a user can slide the open mouth of the bag into the housing. The cross-section of the collar and security bag are stepped (as shown better in FIG. 3 and later) and the front surface 402 at the open end of the housing 300 are stepped inwardly so that the bag may be slid into the opening of the housing. The guide rails and surfaces of the bag help guide a user so that location of the security bag is a straightforward procedure.

Figure 5:
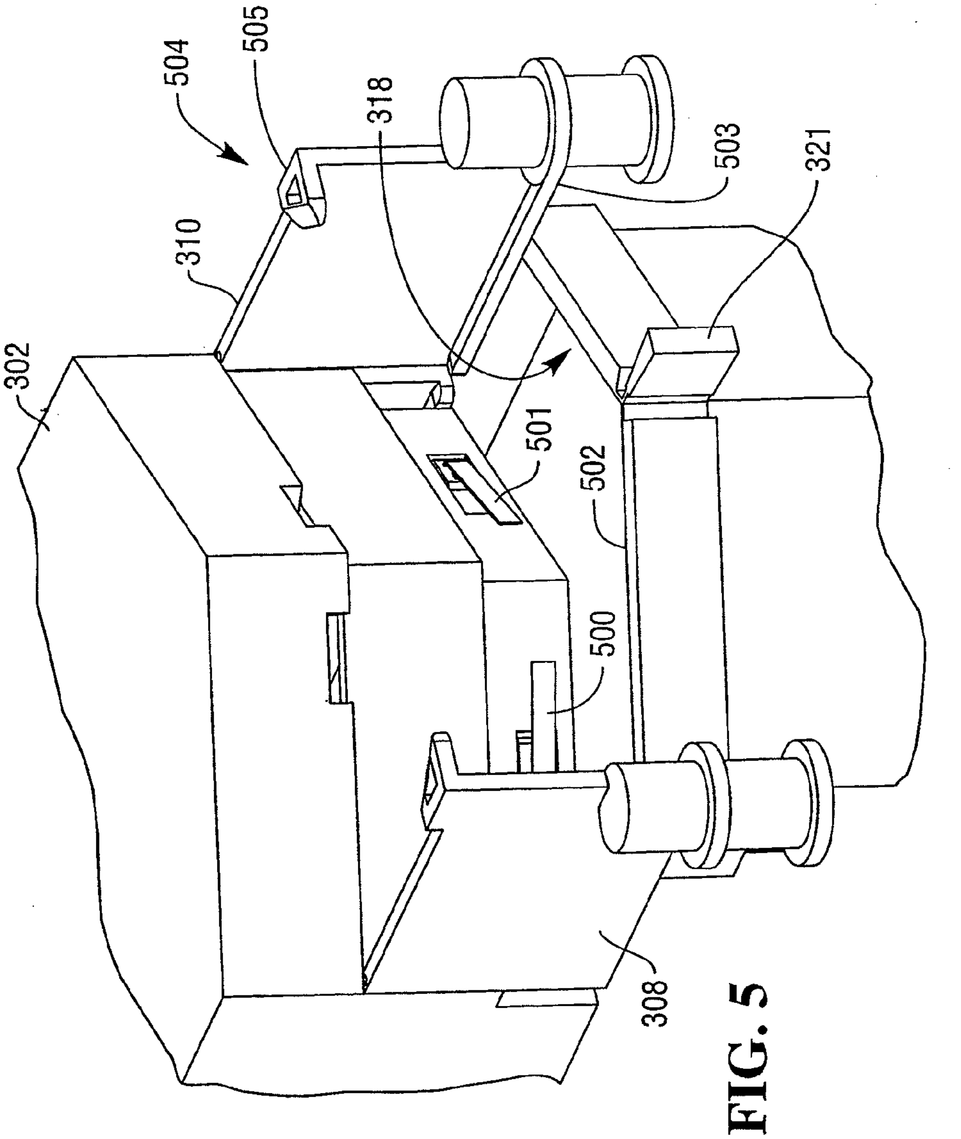
FIG. 5 illustrates the security bag almost fitted within the housing.

FIG. 5 helps illustrate the location of the security bag into an open housing. The figure shows the bag almost fully located within the housing and illustrates how the tab 321 may be grasped together with the pair of end bars 318 to help a user locate the bag in the housing. As illustrated in FIG. 5, contact switches 500, 501 are located on an outer surface of the step down region of the housing so that as the secure bag is urged into the housing an inner surface 502 of the pair of end bars duly abuts with the contact switches. This contact signals that the bag is fully located within the housing and thus is ready for closure of the doors 308,310 at the front of the housing.

As illustrated in FIG. 5, the doors 308,310 include guide rails 503 which extend from one of the ribs of the closing mechanism. This helps assist location of the security bag in the housing. Each door 308,310 also includes a locking tab 504 which is an inwardly extending ear which includes a central aperture 505. As the secure bag is duly located, the doors 308,310 close and a latching mechanism located within the housing (described more clearly hereinafter) operates to engage a latch into each aperture 505 to secure both of the doors in a closed mode of operation. In this state it is impossible to open the doors 308,310 without exerting excessive force on the housing and bag secured therein. Optionally, other locking techniques could be utilised.

Figure 6:
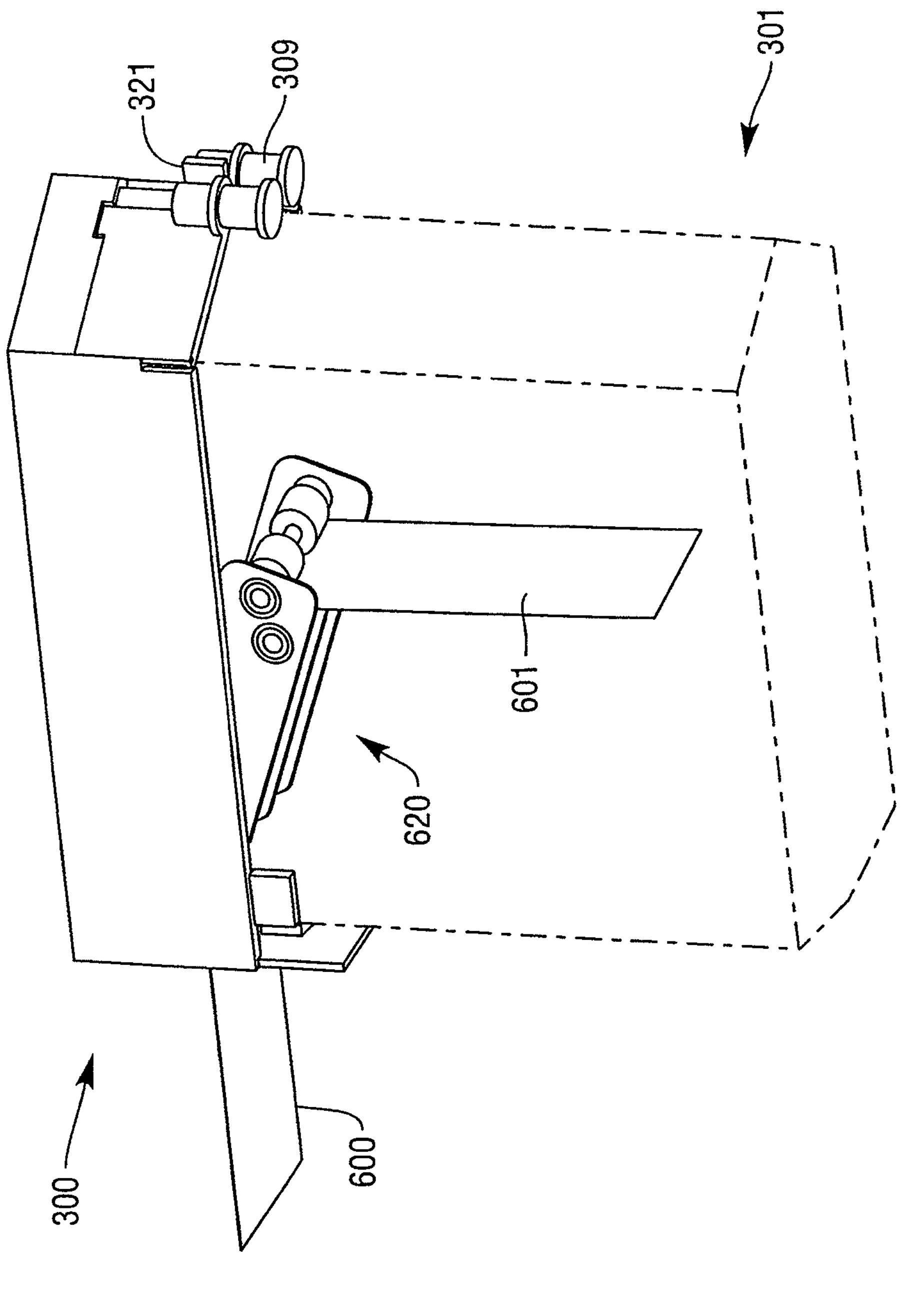
FIG. 6 illustrates items of media entering a closed secure housing in which the security bag is mounted.

FIG. 6 illustrates a view of a security bag 301 duly secured in the housing 300. FIG. 6 also helps illustrate the introduction of an item of media 600 such as a currency note or the like. During use, when a user wishes to deposit items in the self-service terminal 100 these items are inserted into the bunch deposit slot 202 (FIG. 2). These items are then processed by the sheet validator 208, and transported through a slit (not shown) into the security bag 301. Also illustrated in FIG. 6 is a transport mechanism 620 for transporting inserted items of media into a central region of the security bag 301.

This central region is a drop zone, where the media item falls to the bottom of the security bag 301. Single items of media or bunches of items of media may be introduced into the housing 300 and dropped into the secure storage bag 301 in this way. FIG. 6 also illustrates how, when the doors 308,310 of the housing 300 are closed, the tab 321 extends outwardly to provide a user with a handle for extracting the security bag 301 when desired.

Figure 7:
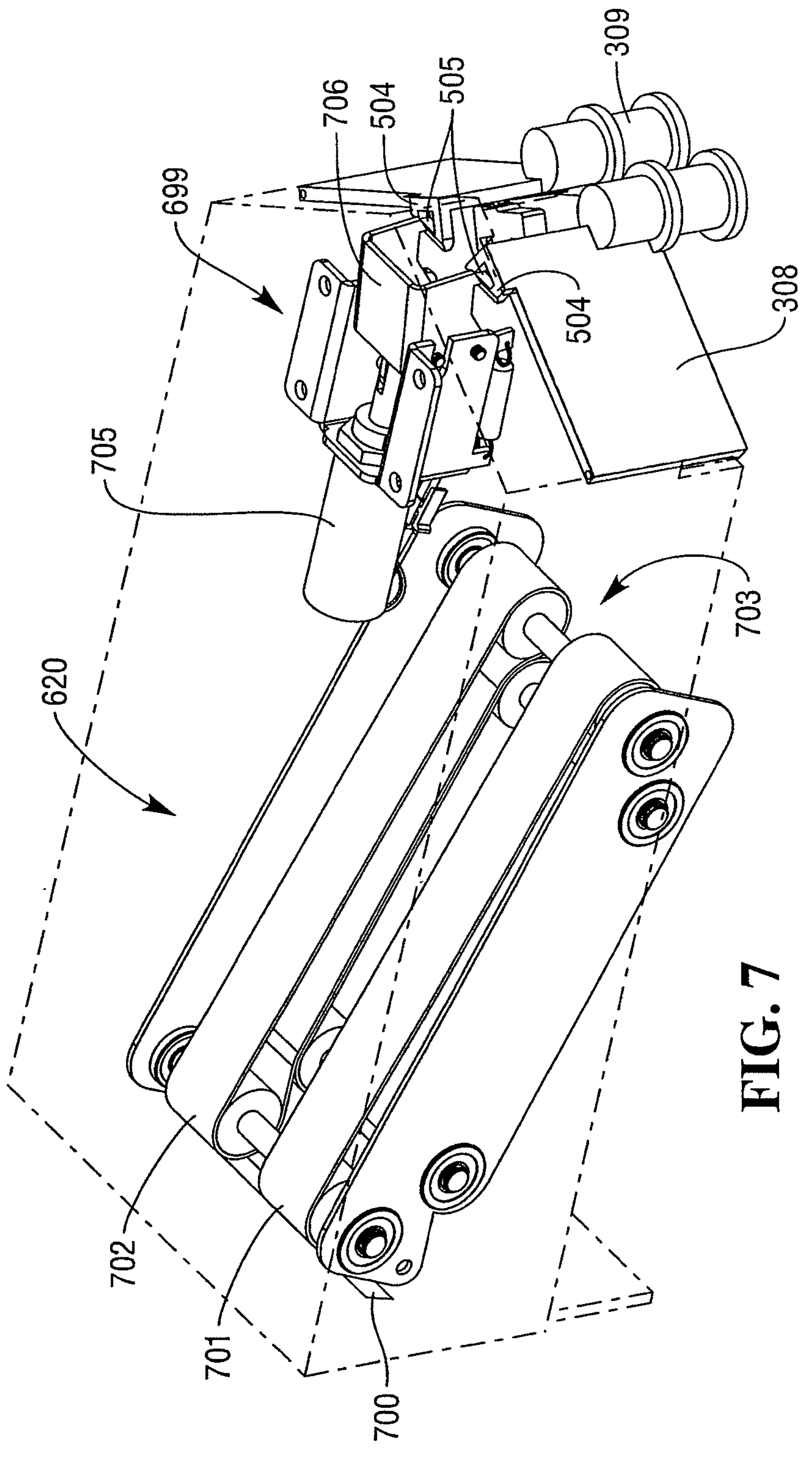
FIG. 7 illustrates parts within the housing.

FIG. 7 helps illustrate the transport mechanism 620 for locating introduced items of media at the drop zone region together with a securing mechanism 699 for locking the doors 308,310 in a closed mode of operation. More particularly, items of media are introduced through a slit 700 at the back wall of the housing 300.

The transport mechanism 620 is pivotably mounted to the housing 300 and pivoted by a motor (not shown) to raise the transport mechanism 620 when the secure bag 301 is being inserted and retracted. This ensures that the transport mechanism 620 does not block entrance or removal of the secure bag 301. This also allows the transport mechanism 620 to protrude into the secure bag 301 when the bag 301 is fully inserted into the housing 300, thereby ensuring that media items being transported into the secure bag 301 are not at risk of missing the secure bag 301. In other embodiments, a solely mechanical arrangement (such as a linkage actuated by the rigid or semi-rigid collar 314 on insertion and removal of the secure bag 301) may be used to retract the transport mechanism 620 from protruding into the secure bag 301. In other embodiments, the transport mechanism 620 may be located above the secure bag 301 so that the transport mechanism 620 does not need to move out of the way of the secure bag 301 as the bag 301 is inserted and removed.

The transport mechanism 620 includes a pair of upper endless belts 701, 702 arranged in a side-by-side configuration and opposed with respect to a pair of lower endless belts 703, 704, which are also arranged in a side-by-side configuration. The endless belts co-operate when driven so that items of media or bunches of items of media which are introduced through the slit 700 in the back wall of the housing 300 are moved from the back wall region to an end region 703 of the endless belt system. As items of media drop from the end of the endless belts, gravity causes the items to fall towards the bottom of the security bag 301.

FIG. 7 also helps illustrate the location of a solenoid 705 which drives a pin connected to a latch 706.

Figure 8:
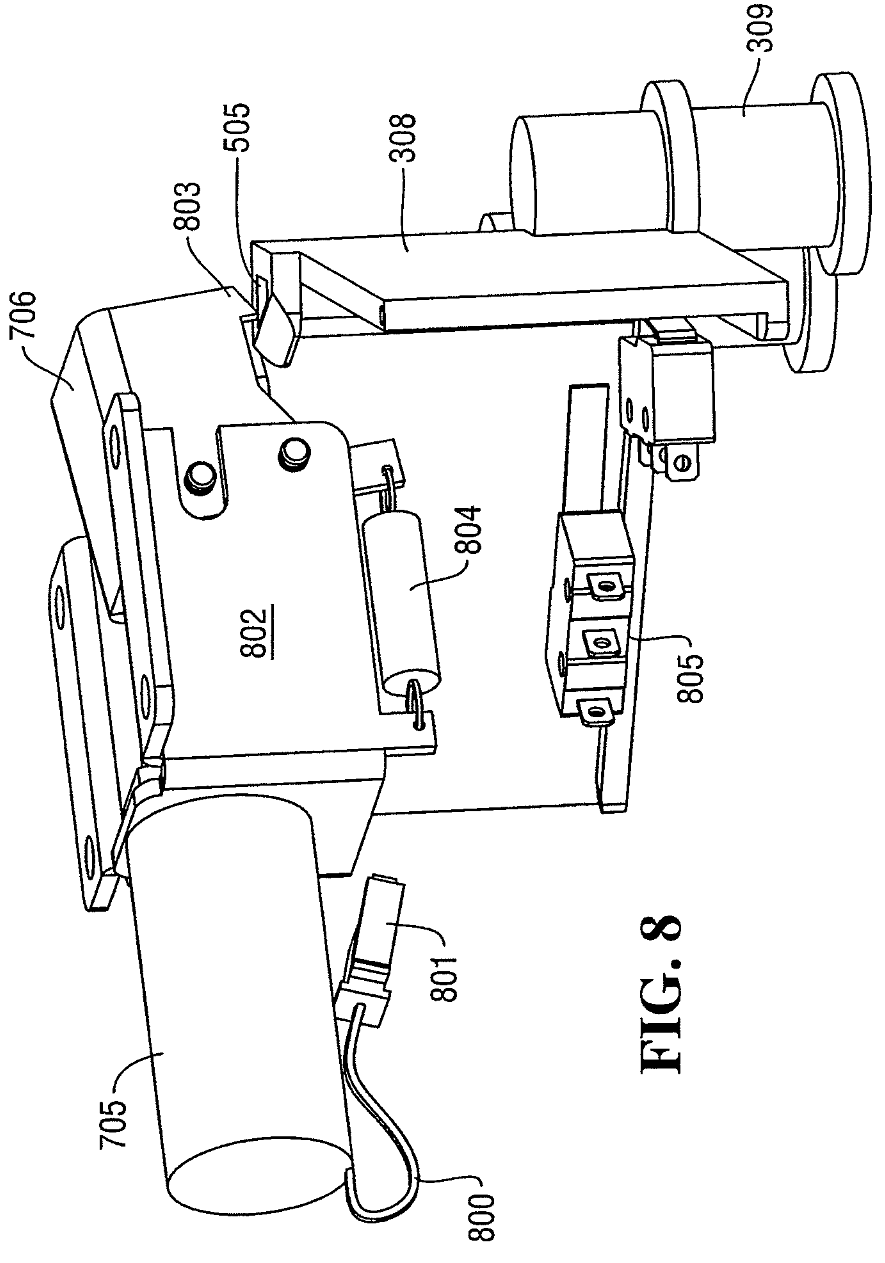
FIG. 8 illustrates how doors of the housing may be closed and locked.

FIG. 8 illustrates the operation of the solenoid latching mechanism 699 in more detail. The solenoid 705 is energized responsive to an input signal on a connection 800 connected via a connector 801 to a controller (not shown). The latching mechanism 699 includes a latch body 802 which may be secured to an underside of the housing roof panel 302 and in which the latch 706 and drive pin (not shown) is mounted.

The latch 706 is pivotably mounted in the latch housing 802. The latch 706 includes a substantially rectangular body having at one end thereof a generally C-shaped cross section which also includes a pair of claws 803 at each open end of the C-shape. The latch 706 is resiliently biased by a spring 804 or some other such biasing device. The claws 803 move in a downward motion to engage with the openings 505 in respective locking tabs 504 of the doors 308,310 to lock the doors 308,310 closed. To release the doors 308,310 the solenoid 705 operates to drive the latch 706 upwardly to move the claws 803 out of the openings 505 in the tabs 504 of the doors 308,310 so that the doors 308,310 may be opened.

As shown in FIG. 8, in an open position in which the solenoid 705 is actuated to overcome the biasing force of the spring 804, the claws 803 of the latch 706 are held out of the way of the tabs 504 carried by the doors 308,310. Connectors 805 are utilised to connect the contact switches 500, 501 with a control unit (not shown).

Figure 9:
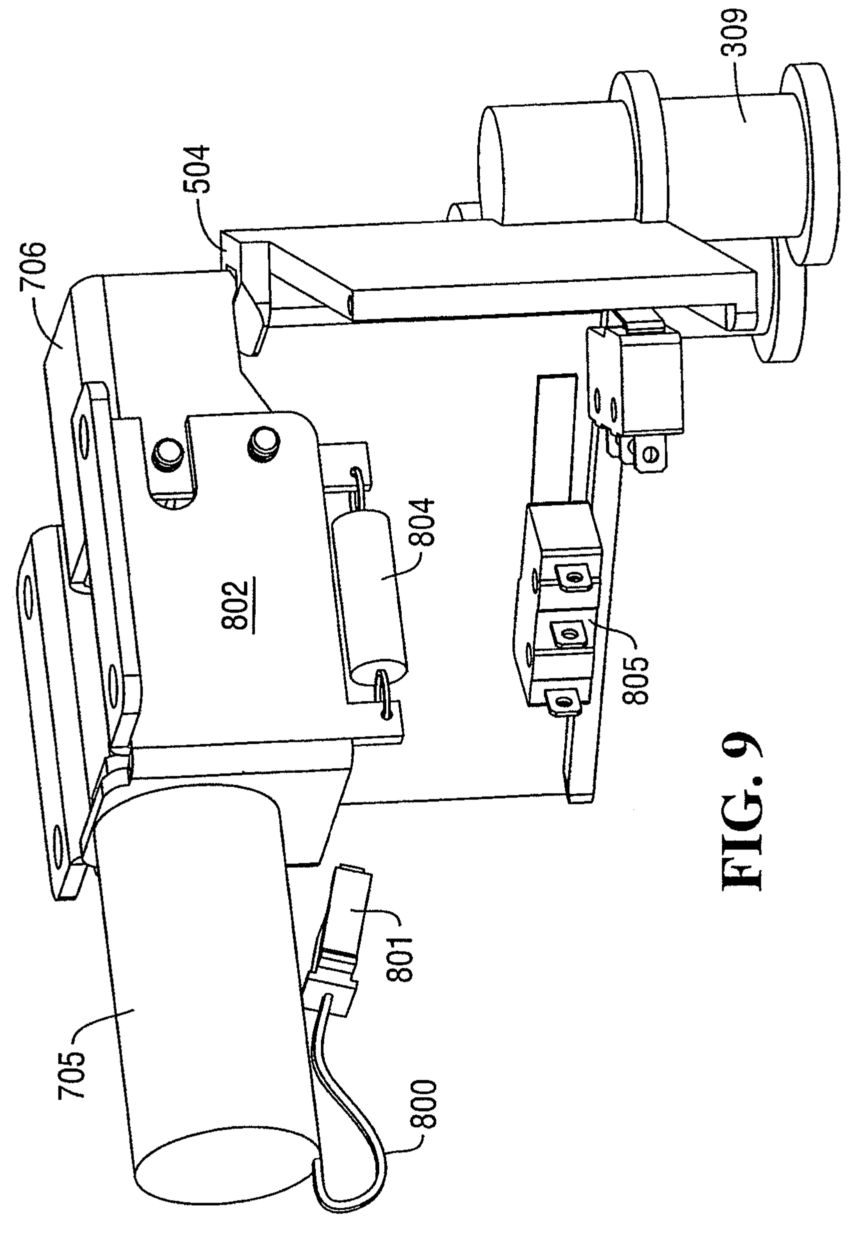
FIG. 9 illustrates how doors of the housing may be closed and locked.

FIG. 9 illustrates operation of the solenoid device in a locking mode of operation in which the solenoid 705 is relaxed. This no longer operates to overcome the biasing for the spring 804 which thus draws the latch 706 downwardly so that the claws 803 are located into the openings 505 in respective locking tabs of the doors of the housing. The latch is held in this position whilst the security bag is within the housing, thus preventing unauthorized personnel from accessing the bag when in a closed mode. In this way, when an authorized user loads an empty bag into the housing and closes the door without any currency notes or checks or the like being present, no theft can occur. Subsequently, the housing is locked with the secure bag in place and items of media duly located in the bag cannot be reached by unauthorized personnel. This helps avoid theft.

Figure 10:
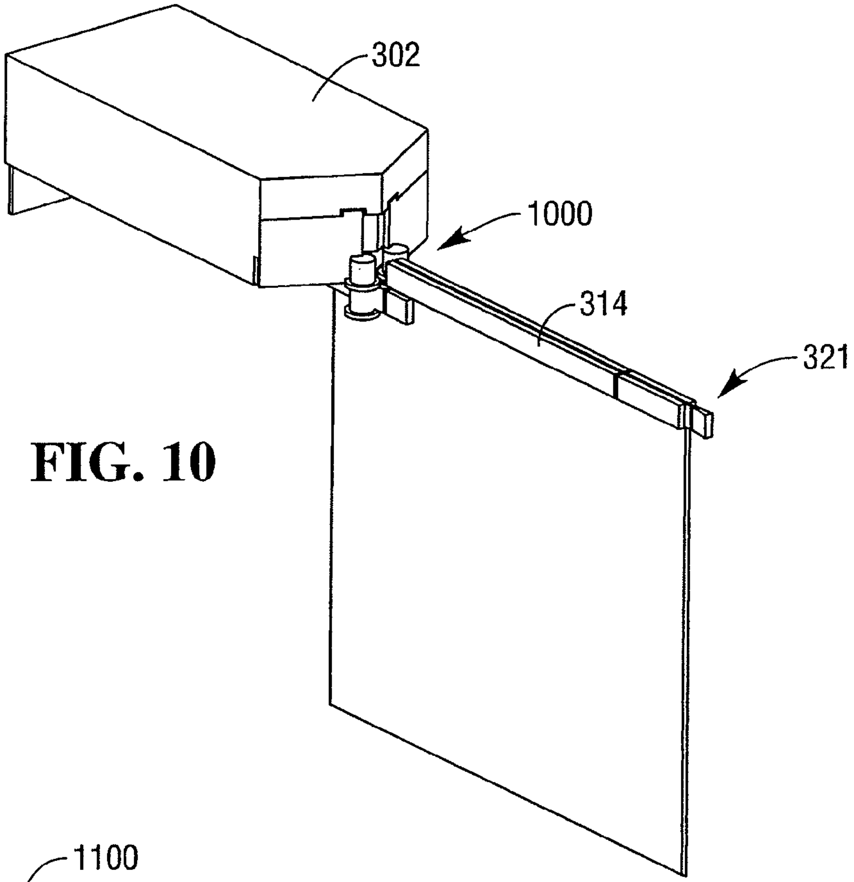
FIG. 10 illustrates how a security bag is removed from a housing.

FIG. 10 illustrates the removal of the security bag 301 from the housing 300. This mode of operation may be utilised when it is estimated that the security bag 301 is full or close to being full. This may be determined by the self-service terminal 100 maintaining a record of deposited items. Alternatively, the removal of a security bag 301 may occur at pre-determined intervals, for example, once per week. In order to remove the security bag 301, an authorized user will be provided with access to the self-service terminal 100 in which the deposit module 150 is located. The user will access the region in the self-service terminal 100 where the housing 300 and security bag 301 are located and will pull on the tab 321. At this stage the doors 308,310 remain locked in a closed configuration, whereupon a gap 1000 between the outer edges of the opposed locked doors 308, 310 is such to enable the security bag 301 to be drawn outwardly from the housing 300. The outer surface of the cylindrical door elements 309, 311 and the closing ribs on those cylindrical elements 309,311 operate to constantly urge opposing parts of the collar at the open mouth of the bag together as the bag is drawn outwardly away from the housing. As the bag is withdrawn, the pair of end bars at the first end of the elongate side bars of the collar are forced together. At least one of the end bars includes a securing mechanism which is irreversible so that as the bag begins to be removed the end bars are squeezed together and irreversibly locked together. As a user continues to withdraw the bag, the elongate side bars starting at their first end are urged together and likewise are secured together in an irreversible fashion. The final parts of the security bag to be fastened together in an irreversible manner are the connecting elements 325, 326 and the pair of end bars at the second end of the elongate side bars of the collar. The bag is constantly sealed as it is removed from between the doors of the housing so that at no point can a person access the contents of the bag without interfering with the bag in a manner which would subsequently be noticeable.

Figure 11:
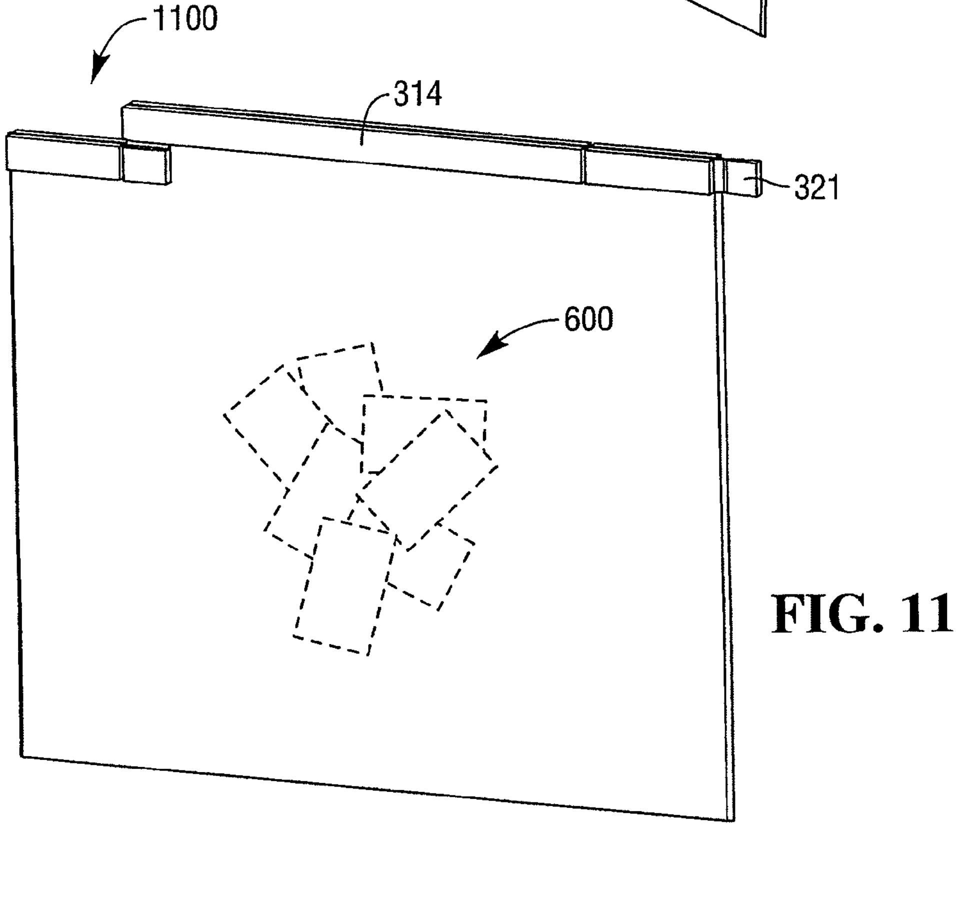
FIG. 11 illustrates a sealed security bag.

FIG. 11 illustrates a secure storage bag in a closed configuration. In this configuration a previously open mouth of the bag is sealed closed. The seal is provided by the collar which extends around the open mouth of the bag prior to closure. The collar is stepped and has a step 1100 at a second end of the elongate bars of the collar. The step 1100 helps ensure that the bag can be duly mounted within the housing. The bag may be manufactured from a material resistant to tampering. However, the bag may be manufactured from a material that is not particularly tamper proof. By closing the bag in a sealed configuration in an irreversible manner any attempt to extract contents from the bag subsequent to its closure will be visible thereafter because of the tamper evident seal provided. For example, tears or crumples or torn parts of a collar or bag will be highly visible. This ensures that a subsequent user will be able to determine that the personnel responsible for accessing and emptying the deposit module has attempted to breach the security of the self-service terminal. This provides a deterrent against unauthorized opening of the security bag 301.

Figure 12:
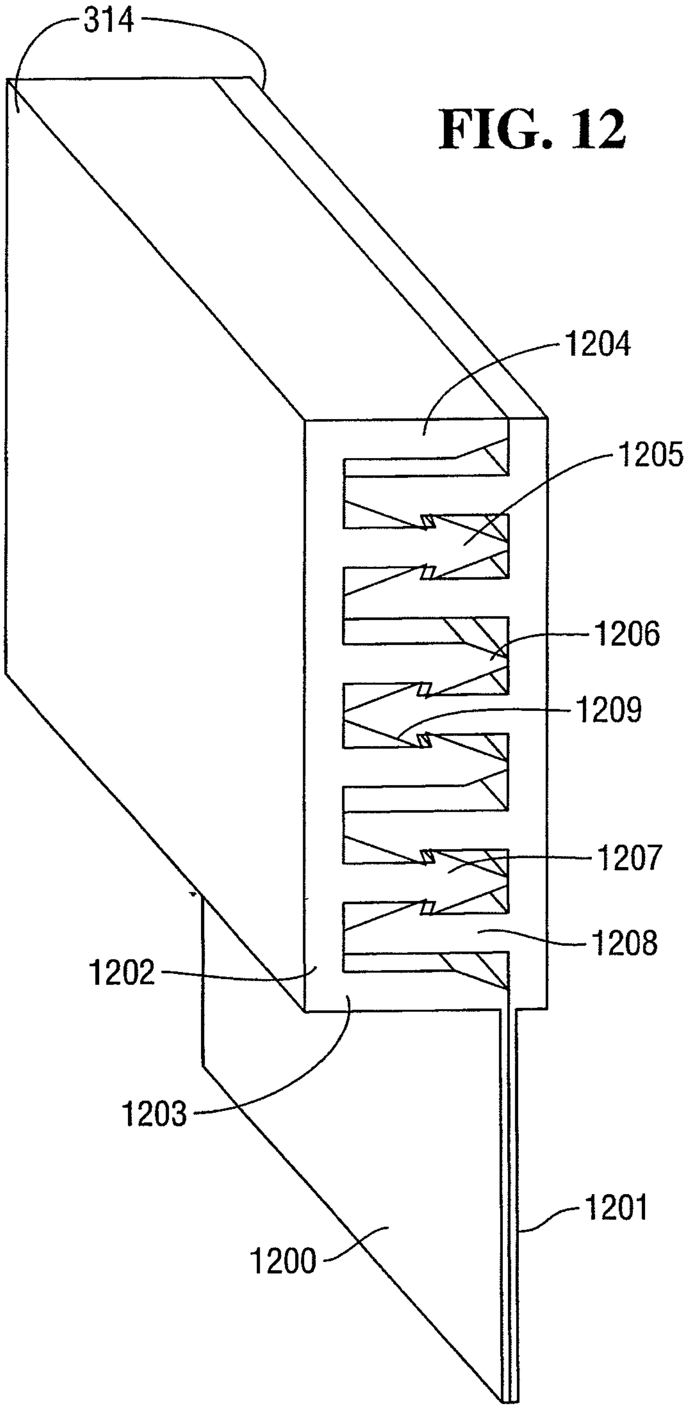
FIG. 12 illustrates an irreversible sealing mechanism of a collar of a security bag.

FIG. 12 illustrates an example of an irreversible sealing mechanism which can be utilised on the collar 314 of the security storage bag 301. The body 313 of the bag 301 is illustrated with opposed panels. A first opposed panel 1200 is located in a face-to-face arrangement with a further panel 1201 when the bag is closed as it is removed from the housing. A side bar or end bar on one side of the bag includes a substantially C-shaped cross section having a side wall 1202 and a lower side wall 1203 and an upper side wall 1204. Arrow-shaped ribs 1205 extend outwardly from the side wall body 1202 between the end walls 1203, 1204. Each arrow-shaped rib 1205 includes a substantially planar section terminating in a point 1206 with backward facing projections 1207. The opposing side bar of the collar includes a side wall with ribs 1208 extending outwardly therefrom. Each rib from the other side of the bag also has an arrow-shaped cross section and is pointed with backward facing projections 1209. As the two sides of the collar are urged together, the ribs flex and eventually the backward facing points click past corresponding points on opposing ribs. Thereafter the ribs spring backwards and the two parts cannot be subsequently pulled apart. This irreversibly locks the collar parts together and thus seals, in an irreversible manner, the open mouth of the bag. It will be appreciated that ultimately the bag may be torn apart by excessive force but only by partially destroying or otherwise visibly tampering with the bag. This makes the security bag tamper evident. Optionally, other forms of sealing mechanism may of course be utilised and the sealing mechanism can be carried on both or just one side of the collar.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method of storing at least one item of media in a secure storage bag, comprising the steps of:

providing an item of media or a bunch of items of media at an input orifice of a housing body of a deposit module;

rotating at least one endless belt member of the housing body to locate said item or bunch of items at a drop zone in the secure storage bag comprising at least one securing element for irreversibly sealing a mouth region of the secure storage bag housed in the housing body; and irreversibly sealing the mouth region of the secure storage bag when the secure storage bag is removed from the housing body by opposing ends of the securing element activating and locking together to seal and close the mouth region shut when a tab is pulled to remove the secure storage bag from the housing body.

2. A product which comprises a computer program comprising program instructions for:

transporting an item of media or a bunch of items of media to an input orifice of a housing body of a deposit module;

rotating at least one endless belt member of the housing body to locate said item or bunch of items at a drop zone in a secure storage bag comprising at least one securing element for irreversibly sealing a mouth region of the secure storage bag housed in the housing body; and irreversibly sealing the mouth region of the secure storage bag when the secure storage bag is removed from the housing body by opposing ends of the securing element activating and locking together to seal and close the mouth region shut when a tab is pulled to remove the secure storage bag from the housing body.

* * * * *